(12) United States Patent
Foser et al.

(10) Patent No.: US 9,677,591 B2
(45) Date of Patent: Jun. 13, 2017

(54) SCREW, BUILDING ENVELOPE, AND INSULATING METHOD

(71) Applicant: Hilti Aktiengesellschaft, Schaan (LI)

(72) Inventors: Thomas Foser, Balzers (LI); Daniel Baudy, München (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 15/031,318

(22) PCT Filed: Oct. 29, 2014

(86) PCT No.: PCT/EP2014/073191
§ 371 (c)(1),
(2) Date: Apr. 22, 2016

(87) PCT Pub. No.: WO2015/067507
PCT Pub. Date: May 14, 2015

(65) Prior Publication Data
US 2016/0258468 A1    Sep. 8, 2016

(30) Foreign Application Priority Data

Nov. 5, 2013    (EP) ..................... 13191527

(51) Int. Cl.
| | |
|---|---|
| *E04B 2/00* | (2006.01) |
| *F16B 25/10* | (2006.01) |
| *F16B 25/00* | (2006.01) |
| *F16B 43/00* | (2006.01) |
| *E04F 13/08* | (2006.01) |
| *E04F 13/12* | (2006.01) |

(Continued)

(52) U.S. Cl.
CPC .......... *F16B 25/103* (2013.01); *E04B 1/7069* (2013.01); *E04B 1/74* (2013.01);
(Continued)

(58) Field of Classification Search
CPC   F16B 25/103; F16B 25/0063; F16B 25/0078; F16B 25/0057; F16B 35/041;
(Continued)

(56) References Cited

U.S. PATENT DOCUMENTS

| | | | | |
|---|---|---|---|---|
| 3,391,720 A | * | 7/1968 | Morse ................... | F16B 35/041 411/259 |
| 3,682,507 A | * | 8/1972 | Waud .................... | F16B 5/0275 411/413 |

(Continued)

FOREIGN PATENT DOCUMENTS

| | | |
|---|---|---|
| DE | 10 2005 039744 A1 | 3/2007 |
| EP | 0 510 563 B1 | 3/1996 |

(Continued)

OTHER PUBLICATIONS

European Patent Office, European Search Report in European Patent Application No. 13191527.4, mailed Mar. 20, 2014.

(Continued)

*Primary Examiner* — Patrick Maestri
(74) *Attorney, Agent, or Firm* — Jeremy Jay

(57) ABSTRACT

The invention relates to a screw, comprising a drive, a drilling tip for producing a bore, said bore having a bore axis and a bore diameter, which drilling tip is spaced apart from the drive in a drive-in direction, and a shaft, which extends from the drive to the drilling tip, wherein the shaft has a stop section, which can be fed through the bore when the drive-in direction of the screw is tilted in relation to the bore axis and which has a stop surface for blocking the feeding of the stop section through the bore when the drive-in direction of the screw is oriented parallel to the bore axis.

16 Claims, 2 Drawing Sheets

(51) Int. Cl.
*E04B 1/70* (2006.01)
*E04B 1/74* (2006.01)
*E04B 1/90* (2006.01)

(52) U.S. Cl.
CPC ............ *E04B 1/90* (2013.01); *E04F 13/0837* (2013.01); *E04F 13/12* (2013.01); *F16B 25/0063* (2013.01); *F16B 25/0078* (2013.01); *F16B 43/001* (2013.01); *E04B 2001/742* (2013.01)

(58) Field of Classification Search
CPC ........ F16B 43/001; E04B 1/74; E04B 1/7069; E04B 1/90; E04B 2001/742
USPC ................................ 52/506.05; 411/412, 424
See application file for complete search history.

(56) References Cited

U.S. PATENT DOCUMENTS 5,649,798 A    7/1997   Ito
2007/0154284 A1   7/2007   Palm

FOREIGN PATENT DOCUMENTS

| FR | 1 005 851 A | 4/1952 |
| JP | S64-2011 Y2 | 3/1983 |
| JP | H0610178 Y2 | 9/1991 |
| JP | 2004-060356 A | 2/2004 |
| JP | 2007-016864 A | 1/2007 |
| NL | 1011531 C2 | 9/2000 |
| WO | WO 03/029664 A1 | 4/2003 |
| WO | WO 2006/007739 A1 | 1/2006 |

OTHER PUBLICATIONS

International Bureau, International Search Report in International Patent Application No. PCT/EP2014/073191, mailed Feb. 19, 2015.
Japan Patent Office, English Translation of Notice of Reasons for Rejection in Japanese Patent Application No. 2016-550991, mailed Jan. 27, 2017.
Australian Patent Office, Examination Report No. 1 for standard (counterpart) Australian Patent Application No. 2014345729, mailed Mar. 15, 2017.

* cited by examiner

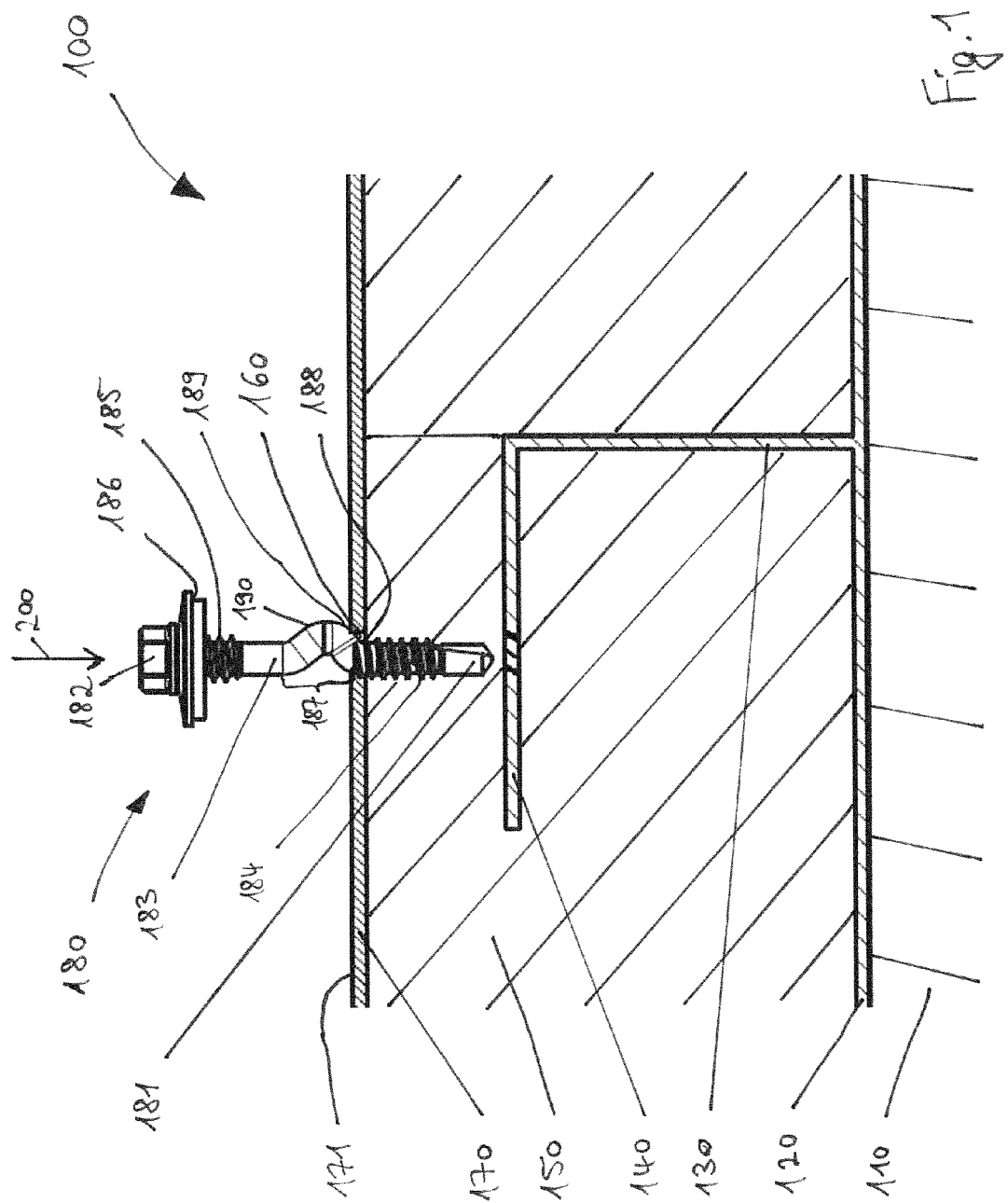

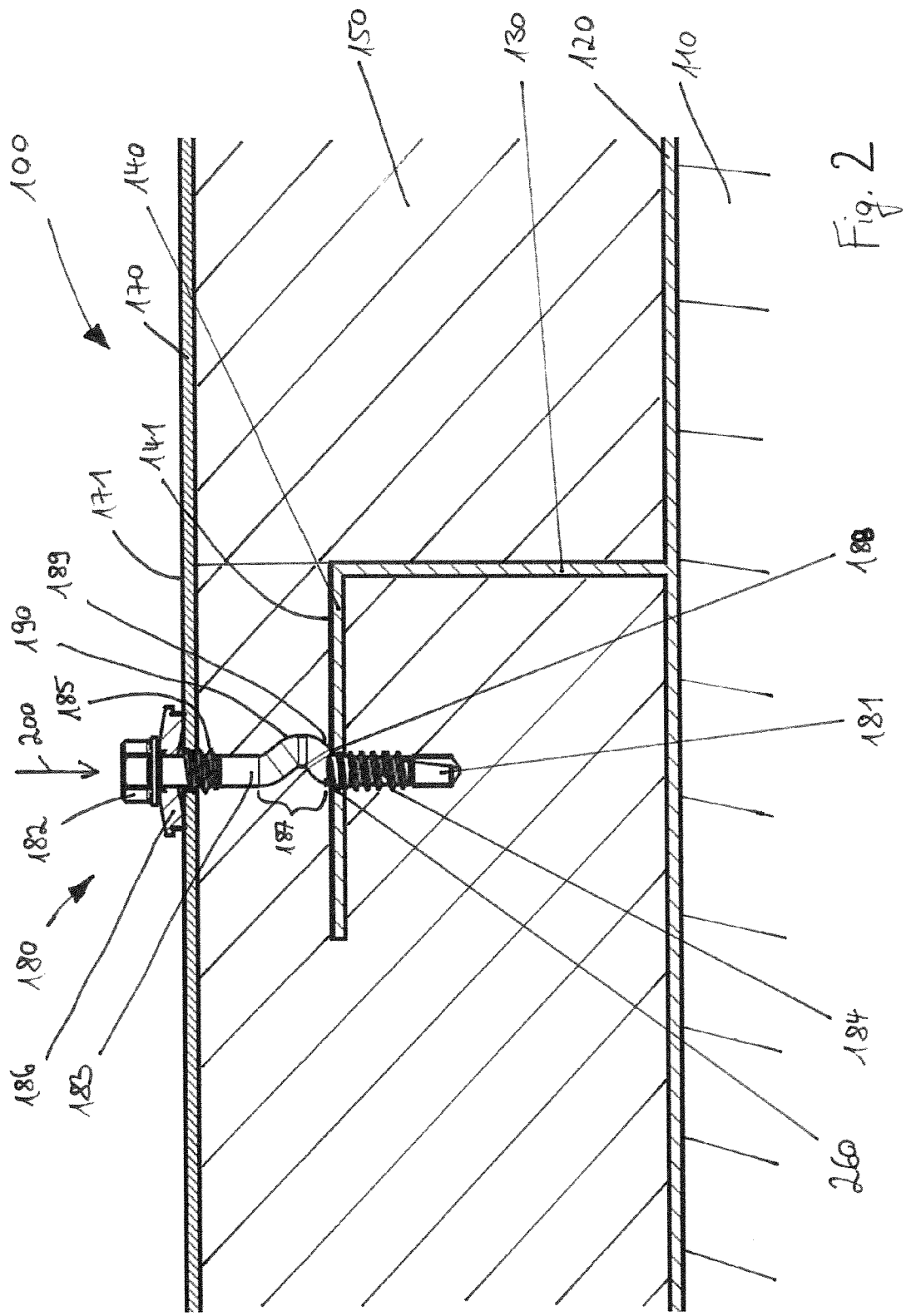

SCREW, BUILDING ENVELOPE, AND INSULATING METHOD

CROSS-REFERENCE TO RELATED APPLICATIONS

This patent application is the U.S. National Stage of International Patent Application No. PCT/EP2014/073191, filed Oct. 29, 2014, which claims the benefit of European Patent Application No. 13191527.4, filed Nov. 5, 2013, which are each incorporated by reference.

The present invention relates to a screw, a building envelope and a method for insulating a building wall or a building roof.

BACKGROUND OF THE INVENTION

Such a method is known from EP 510 563 B1. In order to insulate a rear-ventilated metal façade, the insulating element is inserted into a frame profile mounted on vertical supports and having frame partition walls. To avoid heat bridges, spacing strips are placed on the frame partition walls and screwed in place, between which additional insulating panels are accommodated.

The invention addresses the problem of providing a screw, a building envelope and a method for insulating a building wall or a building roof with which a simplified insulation of a building envelope is possible.

BRIEF SUMMARY OF THE INVENTION

For a screw comprising a drive, a drilling tip spaced apart from the drive in a driving direction for producing a bore having a bore axis and a bore diameter, and further comprising a shaft extending from the drive to the drilling tip, the problem is solved in that the shaft has a stop section, which can be fed through the bore when the driving direction of the screw is tilted in relation to the bore axis, and which has a stop surface for blocking the feeding of the stop section through the bore when the driving direction of the screw is oriented parallel to the bore axis.

An advantageous embodiment is characterized in that the stop section has an elliptical cross section. The cross section is preferably circular.

An advantageous embodiment is characterized in that the stop section comprises a bend of the shaft. Another advantageous embodiment is characterized in that the stop section comprises a curve of the shaft.

An advantageous embodiment is characterized in that the shaft bears a first threaded section, which has a first thread between the stop section and the drilling tip. The first thread preferably extends opposite to the driving direction up to the stop surface or past the stop surface. According to an alternative embodiment, the shaft has a first thread-free section between the stop surface and the first thread.

An advantageous embodiment is characterized in that the shaft bears a second threaded section, which has a second thread between the stop section and the drive. The second thread preferably has a larger outside diameter than the first thread.

The drive preferably comprises a screw head. The second thread particularly preferably extends up to the screw head. According to an alternative embodiment, the shaft has a second thread-free section between the screw head and the second thread.

An advantageous embodiment is characterized in that the screw is inserted in a building envelope having a wall or a roof with an insulating element applied to the wall or the roof in order to secure the insulating element on the wall or the roof. The building envelope preferably has a base plate and a cover plate, wherein the screw fastens the cover plate to the base plate and wherein a distance of the cover plate from the base plate is greater in the area of the screw than a distance between a driving-in end of the drilling tip and the stop surface of the screw.

According to an advantageous refinement, the building envelope additionally has a frame partition wall that protrudes from the baseplate and to which the screw is fastened. The base plate, together with the frame partition wall, then forms a frame. A material of the base plate, the frame partition and/or the cover plate preferably comprises a metal or an alloy.

In a method for insulating a building wall, in which a base plate is fastened to the wall, an insulating element is placed on the base plate, a cover plate is placed on the insulating element and is fastened by means of the screw to the base plate. Preferably a first bore is drilled with the drilling tip in the cover plate, the screw is guided through the first bore hole in the cover plate until the stop surface bears against the cover plate, the screw is tilted in order to move the stop section through the first bore, the screw is tilted back until the driving direction of the screw is oriented perpendicular to the cover plate in the area of the first bore, the screw is guided through the first bore in the cover plate until the drilling tip has drilled a second bore in the base plate, and the screw is guided through the first and second bore until the stop surface bears against the base plate.

BRIEF DESCRIPTION OF THE SEVERAL VIEWS OF THE DRAWING(S)

The invention will be described in detail below with reference to the drawings. Therein:

FIG. 1 shows a cutout of a building element in cross section during a fastening and FIG. 2 shows the cutout of the building envelope after the fastening.

DETAILED DESCRIPTION OF THE INVENTION

FIG. 1 shows a building envelope 100 in a cross section, with base plates 120 screwed or nailed onto a wall 110, from each of which base plates a frame partition wall 130 protrudes to form a steel frame. The frame partition walls 130 each have a fastening region 140 angled off at a right angle. A respective insulating element 150 constructed as an insulating panel is inserted into each frame. The insulating element 150 is covered with respect to the environment by a cover plate 170, which is fastened by means of a screw 180 onto the base plate 120 via the frame partition wall 130. The cover plate 170 is constructed with steel sheet metal. In embodiments not shown, the cover plate is produced from plastic and/or is designed as a film. The insulating panel 150 has a compressible insulation material, for example a mineral wool such as rock wool or glass wool.

The screw 180 has a drive constructed as a screw head 182 and a drilling tip 181 at a distance from the screw head 182 in a driving direction 200 for drilling a first bore 160 into the cover plate 170 and a second bore into the fastening region 140. A shaft 183 that extends between the drilling tip 181 and the screw head 182 of the screw 180 bears a self-tapping first thread 184 in a first threaded section, which adjoins the drilling tip 181, and a second thread 185 in a second thread section. The second thread 185 has a larger diameter than the first thread 184. Beneath the head 182, a sealing washer arrangement 186 having a sealing washer and a cover washer has been pulled onto the screw shaft 183.

The screw shaft 183 comprises a stop section 187 with a bend 188 of the shaft 183, a stop surface 189 and a curve 190 of the shaft 183. The stop surface 189 is formed by the peripheral surface of the shaft due to the bend 188 of the shaft 183 and, in the position shown in FIG. 1, blocks the passage of the stop section 187 through the first bore 160. Everywhere, particularly in the region of the stop section, the shaft 183 has a circular cross section. The first thread 184 extends opposite to the driving direction 200 up to the stop surface 189, and the second thread 185 extends opposite to the driving direction 200 up to the sealing washer arrangement 186. In embodiments that are not shown, the shaft has a thread-free section between the stop surface and the first thread and/or between the sealing washer arrangement and the second thread.

In order to insulate the building envelope 100, the base plate 120 is first fastened to the wall 110. Then the insulating element 150 is placed on the base plate 120 and the cover plate 170 is placed on the insulating element 150 and fastened by means of the screw 180 to the base plate. Initially, the first bore 160 is drilled in the cover plate 170 with the drilling tip 181, so that the first bore 160 has a bore axis perpendicular to the surface 171 of the cover plate 170. The bore diameter of the first bore 160 is then as large as the outer diameter of the drill tip 181. Then the screw 180 is screwed through the first bore 160 by means of the first thread 184, which has a larger outside diameter than the drilling tip 181, and consequently the bore, until the stop surface 189 bears against the surface 171 of the cover plate 170. The position shown in FIG. 1 has then been reached. A passage of the stop section 187 through the first bore 160 is blocked by the stop surface 189 so long as the driving direction 200 of the screw 180 is aligned parallel to the bore axis of the first bore 160, i.e. perpendicular to the surface 171 of the cover plate 170.

In order to move the stop section 187 through the first bore 160, the screw 180 is then tilted. In FIG. 1, the screw head 182 must be tilted to the left. Since the diameter of the shaft 183 in the region of the stop section 187 does not exceed the bore diameter of the first bore 160, the screw 180 can then be pushed through the bore 160. Finally the screw 180 is tilted back until its driving direction 200 is again oriented perpendicular to the surface 171 of the cover plate 170 and is pushed through the first bore 160 until the drilling tip 181 bears against the fastening region 140 of the base plate 120. Tilting of the screw 180 is possible because the distance of the cover plate 170 from the fastening region 140 is greater than the distance between the penetrating end of the drilling tip 181 and the stop surface 189 of the screw 180, and because the insulating panel 150 yields to such a movement of the screw 180.

Then the second bore 260 is drilled into the fastening region 140 by means of the drilling tip 181, such that the second bore 260 has a bore axis perpendicular to the surface 171 of the cover plate 170. The bore diameter of the second bore 160 is then also as large as the outside diameter of the drilling tip 181. Then the screw 180 is screwed through the second bore by means of the first thread 184 until the stop surface 189 bears against the surface 141 of the fastening region 140. The position shown in FIG. 2 has then been reached. A passage of the stop section 187 through the second bore 260 is blocked by the stop surface 189 because the driving direction 200 of the screw 180 is aligned parallel to the bore axis of the second bore 160, i.e. perpendicular to the surface 141 of the fastening region 140. It is no longer possible for the screw 180 to tilt, since the screw 180 is retained in both the first bore 160 and the second bore 260. In order to seal the bore 160 in the cover plate 170, the head 182 presses the sealing washer arrangement 186 against the cover plate 170.

In addition, the cover plate 170 is only connected to the base plate 120 via the insulation plate 150 and the screw 180. The distance between the base plate 120 and the cover plate 170 is determined solely by the screw 180 and, relative to the fastening region 140, corresponds to the distance between the screw head 182 and the stop surface 189, possibly reduced by the thickness of the sealing washer arrangement 186, viewed in the driving direction in each case. Pilot drilling of one of the boards, for example, in order to guide a stop exceeding the diameter of the shaft through the bore, is not necessary with the described screw.

The invention was described with reference to the example of building insulation. It should be pointed out, however, that the screw according to the invention is also suitable for other purposes.

The invention claimed is:

1. A screw comprising a drive, a drilling tip spaced apart from the drive in a driving direction for producing a bore having a bore axis and a bore diameter, and a shaft extending from the drive to the drilling tip, wherein the shaft has a stop section with a cross-section diameter that does not exceed the bore diameter, which can be fed through the bore produced by the drilling tip when the driving direction of the screw is tilted in relation to the bore axis while the stop section is passed through the bore, the stop section having a stop surface for blocking feeding of the stop section through the bore when the driving direction of the screw is oriented parallel to the bore axis.

2. The screw according to claim 1, wherein the stop section has a circular cross section.

3. The screw according to claim 1, wherein the stop section comprises a bend of the shaft.

4. The screw according to claim 1, wherein the shaft has a first threaded section, having a first thread, between the stop section and the drilling tip.

5. The screw according to claim 4, wherein the first thread extends opposite to the driving direction up to the stop surface.

6. The screw according to claim 4, wherein the shaft has a second threaded section, having a second thread, between the stop section and the drive.

7. The screw according to claim 6, wherein the first thread and the second thread each have an outside diameter, and the second thread has a larger outside diameter than the outside diameter of the first thread.

8. The screw according to claim 6, wherein the drive comprises a screw head and wherein the second thread extends up to the screw head.

9. The screw according to claim 6, wherein the drive comprises a screw head and wherein the shaft has a second thread-free section between the screw head and the second thread.

10. A building envelope comprising a wall or a roof having an insulating element mounted on the wall or the roof, the insulating element being fastened to the wall or the roof with the screw according to claim 1.

11. The building envelope according to claim 10, further comprising a base plate and a cover plate, wherein the screw fastens the cover plate to the base plate and wherein a distance of the cover plate from the base plate is greater in an area of the screw than a distance between a driving-in end of the drilling tip and the stop surface of the screw.

12. A method for insulating a building wall, comprising a) fastening a baseplate to the wall, b) placing an insulating element against the base plate, c) placing a cover plate onto the insulating element, d) fastening the cover plate to the base plate by a screw comprising a drive, a drilling tip spaced apart from the drive in a driving direction for producing a bore having a bore axis and a bore diameter, and a shaft extending from the drive to the drilling tip, wherein the shaft has a stop section with a cross-section diameter that does not exceed the bore diameter, which can be fed through the bore produced by the drilling tip when the driving direction of the screw is tilted in relation to the bore axis while the stop section is passed through the bore, the stop section having a stop surface for blocking feeding of the stop section through the bore when the driving direction of the screw is oriented parallel to the bore axis.

13. The method according to claim 12, comprising
- d1) drilling a first bore into the cover plate using the drilling tip,
- d2) guiding the screw through the first bore in the cover plate until the stop surface bears against the cover plate,
- d3) tilting the screw to move the stop section through the first bore,
- d4) tilting back the screw until the driving direction of the screw is oriented perpendicular to the cover plate in a region of the first bore,
- d5) guiding the screw through the first bore until the drilling tip bears against the base plate,
- d6) drilling a second bore with the drilling tip, and
- d7) guiding the screw through the first and second bores until the stop section bears against the base plate.

14. The screw according to claim 2, wherein the stop section comprises a bend of the shaft.

15. The screw according to claim 2, wherein the shaft has a first threaded section, having a first thread, between the stop section and the drilling tip.

16. The screw according to claim 3, wherein the shaft has a first threaded section, having a first thread, between the stop section and the drilling tip.

* * * * *